(12) United States Patent
Lin (10) Patent No.: US 8,699,086 B2
(45) Date of Patent: Apr. 15, 2014

(54) METHOD FOR IMAGE CORRECTION AND SCANNER USING THE SAME

(75) Inventor: Theta Lin, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 373 days.

(21) Appl. No.: 13/292,097

(22) Filed: Nov. 9, 2011

(65) Prior Publication Data

US 2012/0127536 A1    May 24, 2012

(30) Foreign Application Priority Data

Nov. 23, 2010    (TW) ................. 99140435 A (51) Int. Cl.
*H04N 1/04* (2006.01)
*G06T 5/00* (2006.01)

(52) U.S. Cl.
USPC .......... 358/3.26; 358/498; 358/486; 358/497; 358/474; 358/505; 382/312; 382/318

(58) Field of Classification Search
None
See application file for complete search history.

(56) References Cited

U.S. PATENT DOCUMENTS 8,233,201 B2 * 7/2012 Toyoda ......................... 358/488

FOREIGN PATENT DOCUMENTS

| CN | 101620395 | 1/2010 |
|----|-----------|--------|
| JP | 07-037018 | 2/1995 |
| JP | 2002-354207 | 12/2002 |
| TW | 569147 | 1/2004 |
| TW | I256836 | 6/2006 |
| TW | I314830 | 9/2009 |
| TW | 201116411 | 5/2011 |

OTHER PUBLICATIONS

"Office Action of China Counterpart Application", issued on Dec. 4, 2013, p. 1-p. 10, in which the listed references were cited.

* cited by examiner

*Primary Examiner* — Quang N Vo
(74) *Attorney, Agent, or Firm* — Jianq Chyun IP Office (57) ABSTRACT

A method for image correction and a scanner using the same are provided. The scanner includes an image sensor and an automatic document feeder. The automatic document feeder has a paperweight mechanism. The method includes marking a first and a second characteristic regions on the paperweight mechanism; using the image sensor to search the two black characteristic regions to define a scan line; when the document is to be scanned, moving the image sensor to a position corresponding to the scan line, and starting to scan the document in order to obtain a scanned image; identifying the scanned image to obtain two position information associated with the two black characteristic regions; calculating a tilt angle of the scanned image according to a distance between the two black characteristic regions and the two location information; and finally correcting the scanned image angle according to the tilt angle.

22 Claims, 5 Drawing Sheets

METHOD FOR IMAGE CORRECTION AND SCANNER USING THE SAME

CROSS-REFERENCE TO RELATED APPLICATION

This application claims the priority benefit of Taiwan application serial no. 99140435, filed on Nov. 23, 2010. The entirety of the above-mentioned patent application is hereby incorporated by reference herein and made a part of this specification.

BACKGROUND

1. Field of the Invention

The invention relates to a scan technique. Particularly, the invention relates to a method for correcting a scanned image and a scanner using the same.

2. Description of Related Art

A commonly used sheet-feed scanner includes an automatic document feeder (ADF). A document can be fed through a feed port of the ADF, and transported through a set of rollers, so that an image of the document can be captured by an image sensor (capturing) device inside the scanner, and transmitted to a computer. However, when the document is picked up, the fed document is probably tilted due to a mechanical structure of the scanner or differences of paper properties. Since the document is tilted, the scanned image is also tilted, which may cause a poor scanning quality.

SUMMARY OF THE INVENTION

Accordingly, the invention is directed to a method for image correction and a scanner using the same, by which a tilt angle of a document can be calculated, so as to adaptively correct a scanned image of the document.

The invention is directed to a method for image correction of a scanner. The scanner includes an image sensor and an automatic document feeder. The automatic document feeder has a paperweight mechanism, and the paperweight mechanism is used to press a document flat. The method is as follows. A first and a second black characteristic regions are marked on the paperweight mechanism. The image sensor is used to search the first black characteristic region and the second black characteristic region so as to define a scan line. When the document is to be scanned, the image sensor is moved to a position corresponding to the scan line and starts to scan the document, so as to obtain a scanned image. The scanned image is identified to obtain two position information associated with the first and the second black characteristic regions. A tilt angle of the scanned image is calculated according to a distance between the first and the second black characteristic regions and the two position information. The scanned image is corrected according to the tilt angle.

In an embodiment of the invention, the method for image correction of the scanner further includes initializing the scanner before defining the scan line.

In an embodiment of the invention, the scan line is aligned to an edge of the first black characteristic region and an edge of the second black characteristic region.

In an embodiment of the invention, a mathematic trigonometric function is used to calculate the tilt angle.

In an embodiment of the invention, the step of calculating the tilt angle includes calculating a first distance D1 between the first and the second black characteristic regions, a second distance D2 between the two position information, and the tilt angle $\tan^{-1}(D2/D1)$, where the first distance is parallel to the scan line, and the second distance is perpendicular to the scan line.

In an embodiment of the invention, the step of calculating the tilt angle includes obtaining the tilt angle according to a look-up table, where the look-up table includes a corresponding relationship of the distance between the first and the second black characteristic regions, the two position information, and the tilt angle.

In an embodiment of the invention, before the scanned image is corrected, a part of image having the black character region in the scanned image is first compensated and covered by a peripheral color of the black character region.

In an embodiment of the invention, when the scan line is defined, position information corresponding to the scan line is further stored.

In an embodiment of the invention, the first black characteristic region and the second black characteristic region are symmetric and identical in size.

In an embodiment of the invention, the first black characteristic region and the second black characteristic region are rectangles of a same size.

According to another aspect, the invention provides a scanner including an automatic document feeder having a paperweight mechanism, where the paperweight mechanism is used to press a document flat, and the paperweight mechanism has a first black characteristic region and a second black characteristic region thereon. The scanner further includes a detection device, which is used for detecting whether the document is placed on the automatic document feeder. The scanner further includes an image sensor, which is used for capturing an image of the document. The scanner further includes a controller, which is coupled to the automatic document feeder, the detection device and the image sensor, and is used for controlling operations of the automatic document feeder, the detection device and the image sensor, and is used for identifying a scanned image of the document to obtain two position information associated with the first and the second black characteristic regions, and calculating a tilt angle of the scanned image according to a distance between the first and the second black characteristic regions and the two position information, so as to correct the scanned image according to the tilt angle.

In an embodiment of the invention, the controller controls the image sensor to search the first black characteristic region and the second black characteristic region, so as to define a scan line.

In an embodiment of the invention, the scan line is aligned to an edge of the first black characteristic region and an edge of the second black characteristic region.

In an embodiment of the invention, when the document is to be scanned, the controller controls the image sensor to move to a position corresponding to the scan line, so as to scan the document.

In an embodiment of the invention, the controller further includes a storage device for storing the scanned image and position information corresponding to the scan line.

In an embodiment of the invention, the controller uses a mathematic trigonometric function to calculate the tilt angle of the scanned image.

In an embodiment of the invention, the controller calculates a first distance D1 between the first and the second black characteristic regions, a second distance D2 between the two position information, and the tilt angle $\tan^{-1}(D2/D1)$, where the first distance is parallel to the scan line, and the second distance is perpendicular to the scan line.

In an embodiment of the invention, the controller obtains the tilt angle according to a look-up table, where the look-up table includes a corresponding relationship of the distance between the first and the second black characteristic regions, the two position information, and the tilt angle.

In an embodiment of the invention, before the controller corrects the scanned image, a peripheral color of the black character region is used to compensate and cover a part of image having the black character region in the scanned image.

In an embodiment of the invention, the first black characteristic region and the second black characteristic region are symmetric and identical in size.

In an embodiment of the invention, the first black characteristic region and the second black characteristic region are rectangles of a same size.

In an embodiment of the invention, the scanner further includes an interface module for connecting an external host, where the controller controls an operation of the interface module.

According to the above descriptions, in the method for image correction of the scanner of the invention, the first black characteristic region and the second black characteristic region are marked on the paperweight mechanism, and the image sensor is used to search the first black characteristic region and the second black characteristic region to define the scan line. When the document is to be scanned, the image sensor is moved to a position corresponding to the scan line and starts to scan the document, so as to obtain a scanned image. The scanned image is identified to obtain two position information associated with the first and the second black characteristic regions. A tilt angle of the scanned image is calculated according to a distance between the first and the second black characteristic regions and the two position information. The scanned image is corrected according to the tilt angle. In this way, the problem mentioned in the related art can be effectively resolved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1A:
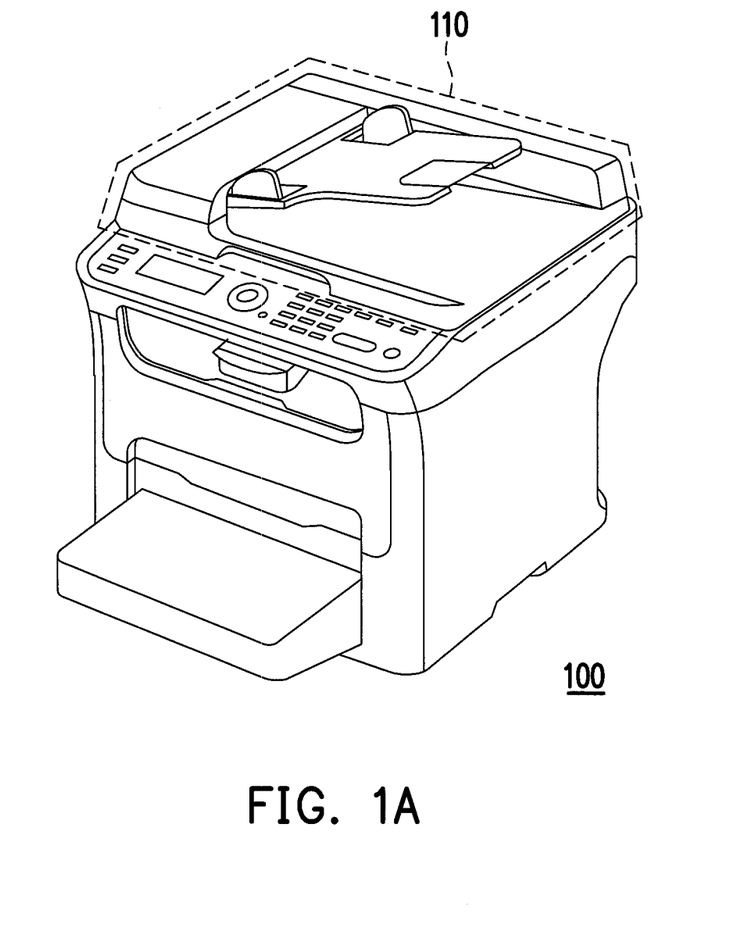
FIG. 1A and FIG. 1B are schematic diagrams illustrating a scanner according to an embodiment of the invention.
Figure 1B:
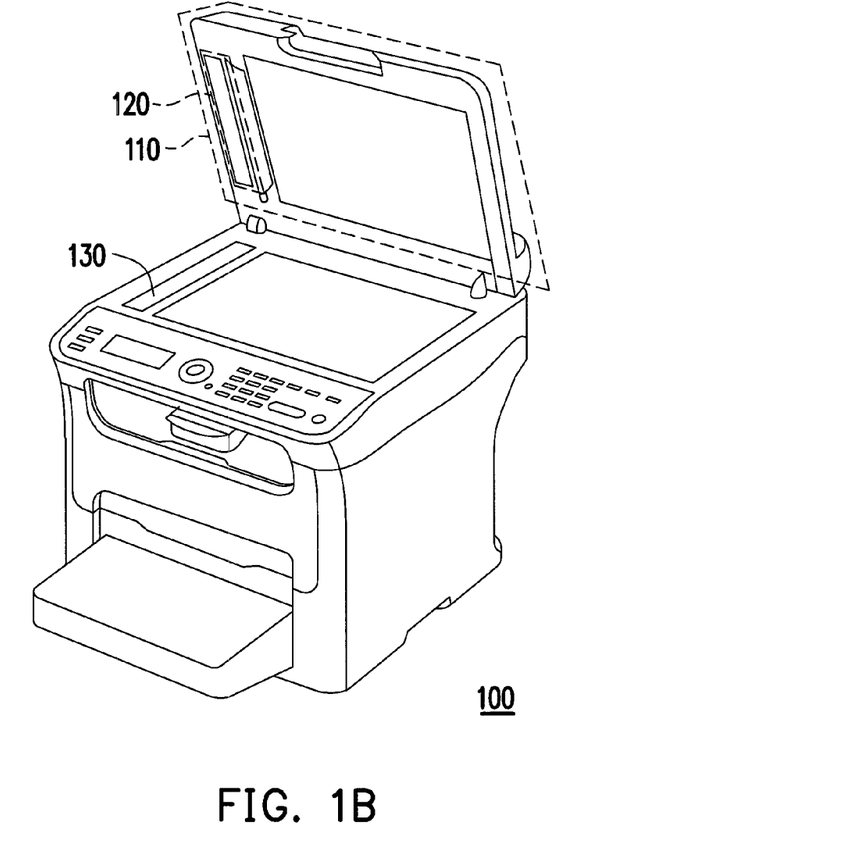
Figure 1C:
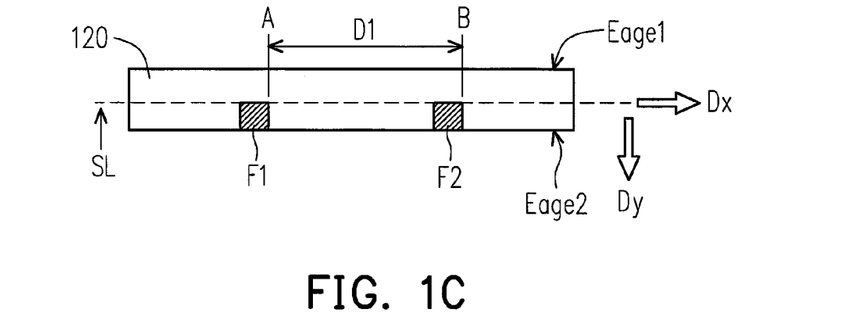
FIG. 1C is a schematic diagram of a paperweight mechanism according to an embodiment of the invention.

FIG. 1A and FIG. 1B are schematic diagrams illustrating a scanner according to an embodiment of the invention. FIG. 1C is a schematic diagram of a paperweight mechanism according to an embodiment of the invention.

Referring to FIGS. 1A, 1B and 1C, the scanner 100 of the present embodiment includes an automatic document feeder (ADF) 110, and the ADF 110 has a paperweight mechanism 120. The paperweight mechanism 120 is used to press a document flat, so that the document can be smoothly transported to a transparent scanning area 130 of the scanner 100. Here, a first direction Dy and a second direction Dx are defined, where the first direction Dy is perpendicular to a first edge Edge1 and a second edge Edge2 of a rectangular plane of the paperweight mechanism 120, the second direction Dx is parallel to the first edge Edge1 and the second edge Edge2, and the first direction Dy is perpendicular to the second direction Dx. A first black characteristic region F1 and a second black characteristic region F2 are marked on the second edge Edge2 of the paperweight mechanism 120.

In detail, the first black characteristic region F1 and the second black characteristic region F2 can be two symmetric black characteristic regions of the same size. The two black characteristic regions can be rectangles of the same size. The size of each of the two black characteristic regions can be 1 mm×1 mm. The sizes and shapes of the two black characteristic regions of the present embodiment are only used as a selective example, and the invention is not limited thereto.

Figure 2:
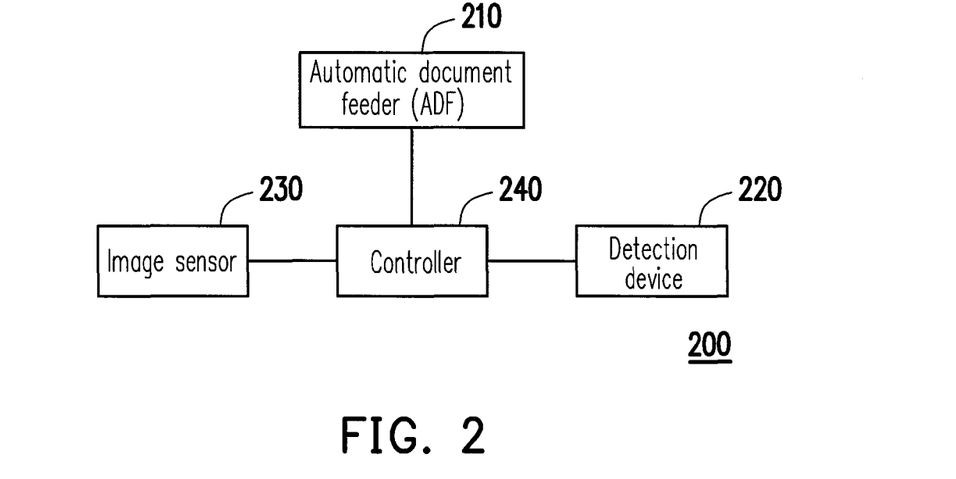
FIG. 2 is a circuit block diagram of a scanner according to an embodiment of the invention.
Figure 3:
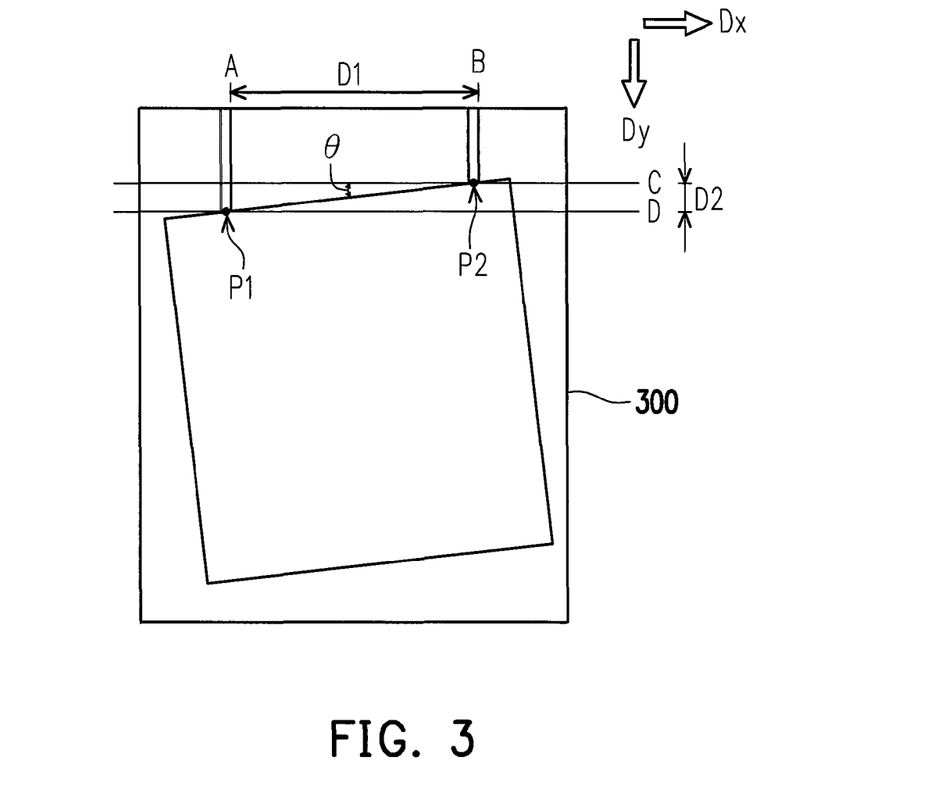
FIG. 3 is a schematic diagram of a scanned image according to an embodiment of the invention.

FIG. 2 is a circuit block diagram of a scanner according to an embodiment of the invention. FIG. 3 is a schematic diagram of a scanned image according to an embodiment of the invention. Referring to FIG. 1C, FIG. 2 and FIG. 3, the scanner 200 includes an ADF 210, a detection device 220, an image sensor 230 and a controller 240. The ADF 210 has the paperweight mechanism 120, where the first black characteristic region F1 and the second black characteristic region F2 are marked on the paperweight mechanism 120, and a distance between the two black characteristic regions is a first distance D1.

The controller 240 is coupled to the ADF 210, the detection device 220 and the image sensor 230. The controller 240 can be used to control operations of the ADF 210, the detection device 220 and the image sensor 230. For example, when the scanner 200 is booted, the controller 240 controls initializations of the ADF 210, the detection device 220 and the image sensor 230. The detection device 220 is used for detecting whether the document is placed on the ADF 210. The image sensor 230 is used for capturing a scanned image 300 of the document.

The controller 240 uses the image sensor 230 to search the first black characteristic region F1 and the second black characteristic region F2, so as to define a scan line SL. The scan line SL can be aligned to an edge of the first black characteristic region F1 and an edge of the second black characteristic region F2, where an extending direction of the scan line SL can be parallel to the second direction Dx.

When the controller 240 defines the scan line SL, the controller 240 can further store position information of the scan line SL in a storage device (not shown in FIG. 2), so as to facilitate directly driving the image sensor 230 to the position of the scan line SL during a next document scanning operation.

When the document is to be scanned, the ADF 210 can adjust a time required for feeding the document according to a paper type setting. For example, the paper type setting can be a standard A4 size, a letter size or a customized size, and when the ADF 210 starts to feed the document, the image sensor 230 simultaneously scans the document.

After the document is scanned and completely passes through the paperweight mechanism 120, the controller 240 can control the image sensor 230 to perform detection for another period of time, so as to avoid incomplete scanning. The scanned image 300 of FIG. 3 has a tilt angle θ, and two black characteristic regions are appeared at an end part of the scanned image 300, which form two black lines after the scanning operation is completed.

The controller 240 can be used to identify whether each scan information in the scanned image 300 of the document has the black characteristic regions, so as to obtain two position information (P1, P2) associated with the first black characteristic region F1 and the second black characteristic region F2. The two position information (P1, P2) can be two edge point information at the end part of the scanned image 300.

The controller 240 uses a mathematic trigonometric function to calculate the tilt angle θ of the scanned image 300 according to the first distance D1 between the first black characteristic region F1 and the second black characteristic region F2 and the two position information (P1, P2), so as to correct the scanned image 300 according to the tilt angle θ.

In another embodiment, when the controller 240 calculates the tilt angle θ of the scanned image, the distance between the first and the second black characteristic regions F1 and F2 along the second direction Dx is defined as the first distance D1, where the first distance D1=|position A−position B|, and a relative distance between the two position information (P1, P2) along the first direction Dy is defined as a second distance D2, where the second distance D2=|position D−position C|. Then, the tilt angle θ=$\tan^{-1}(D2/D1)$ is obtained.

Moreover, the controller 240 can also obtain the tilt angle θ according to a look-up table, where the look-up table includes a corresponding relationship of the first distance D1, the second distances D2 associated with the two position information, and the tilt angle θ.

It should be noticed that before the scanned image 300 is corrected, a part of image having the black character region in the scanned image 300 is first compensated and covered by a peripheral color of the black character region, so as to improve a scanning quality. Then, the controller 240 can directly correct the scanned image according to the tilt angle θ. In this way, the scanner 200 can correct a tilt angle of the scanned image to reduce a burden of post image processing and greatly improve the processing efficiency, so as to achieve the expected scanning quality.

An embodiment is provided below to further convey the spirit of the invention to those skilled in the art.

Figure 4:
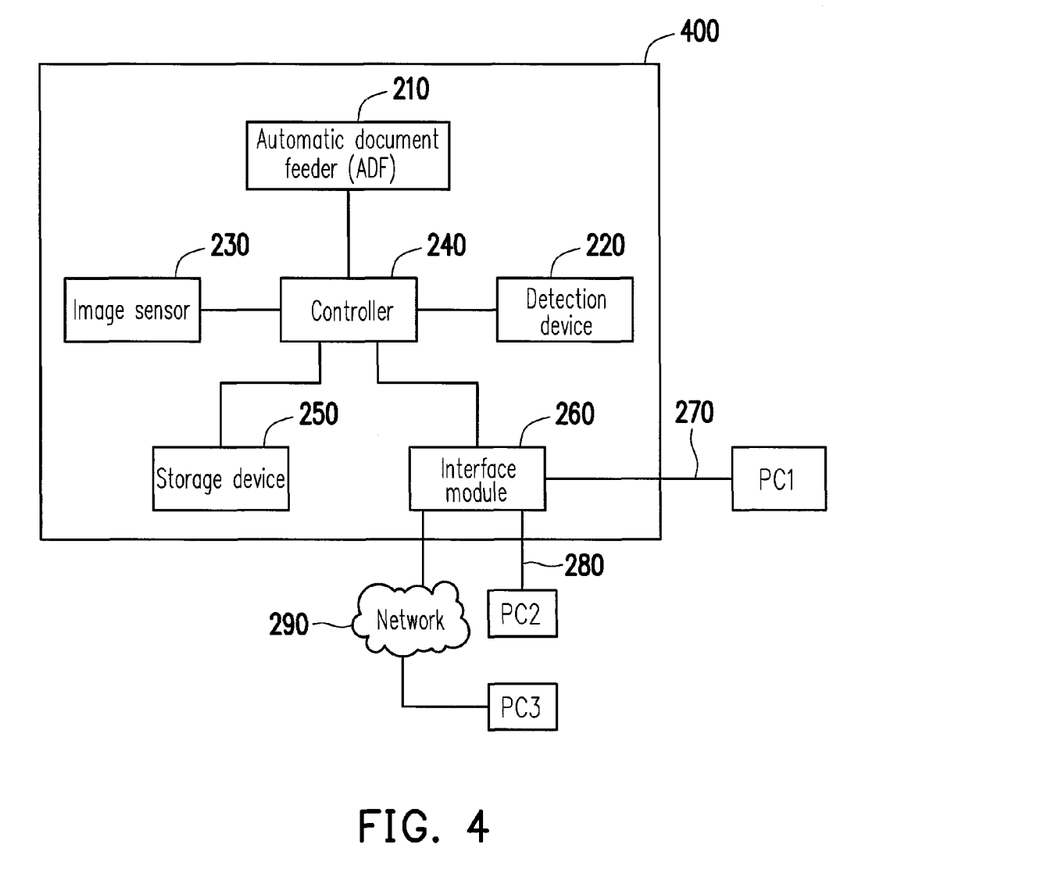
FIG. 4 is a circuit block diagram of a scanner according to another embodiment of the invention.

FIG. 4 is a circuit block diagram of a scanner according to another embodiment of the invention. Referring to FIG. 4, similar to the circuit structure of FIG. 2, the scanner 400 may include the ADF 210, the detection device 220, the image sensor 230, the controller 240, a storage device 250 and an interface module 260.

The controller 240 is coupled to the ADF 210, the detection device 220, the image sensor 230, the storage device 250 and the interface module 260, and controls operations of the ADF 210, the detection device 220, the image sensor 230, the storage device 250 and the interface module 260.

The storage device 250 is used to store various parameters, for example, information of the scan line SL, the scanned image, or the look-up table related to the tilt angle θ. The interface module 260 is used to connect an external host for data transmission, for example, the interface module 260 can be connected to an external host PC1 through a USB cable, or connected to an external host PC2 through a network cable 280, or connected to an external host PC3 through a network 290.

The controller 240 can directly correct the scanned image according to the tilt angle θ. After the controller 240 corrects the scanned image of the document, the corrected scanned image can be stored or output to the external host PC1, PC2 or PC3.

It should be noticed in another embodiment, the controller 240 can transmit the tilt angle θ and the scanned image to the external host PC1, PC2 or PC3. Then, the external host PC1, PC2 or PC3 corrects the scanned image according to the tilt angle θ. After the external host corrects the scanned image, it can store the corrected scanned image or output the corrected scanned image for printing. In this way, the similar effect of the aforementioned embodiment can be achieved.

Figure 5:
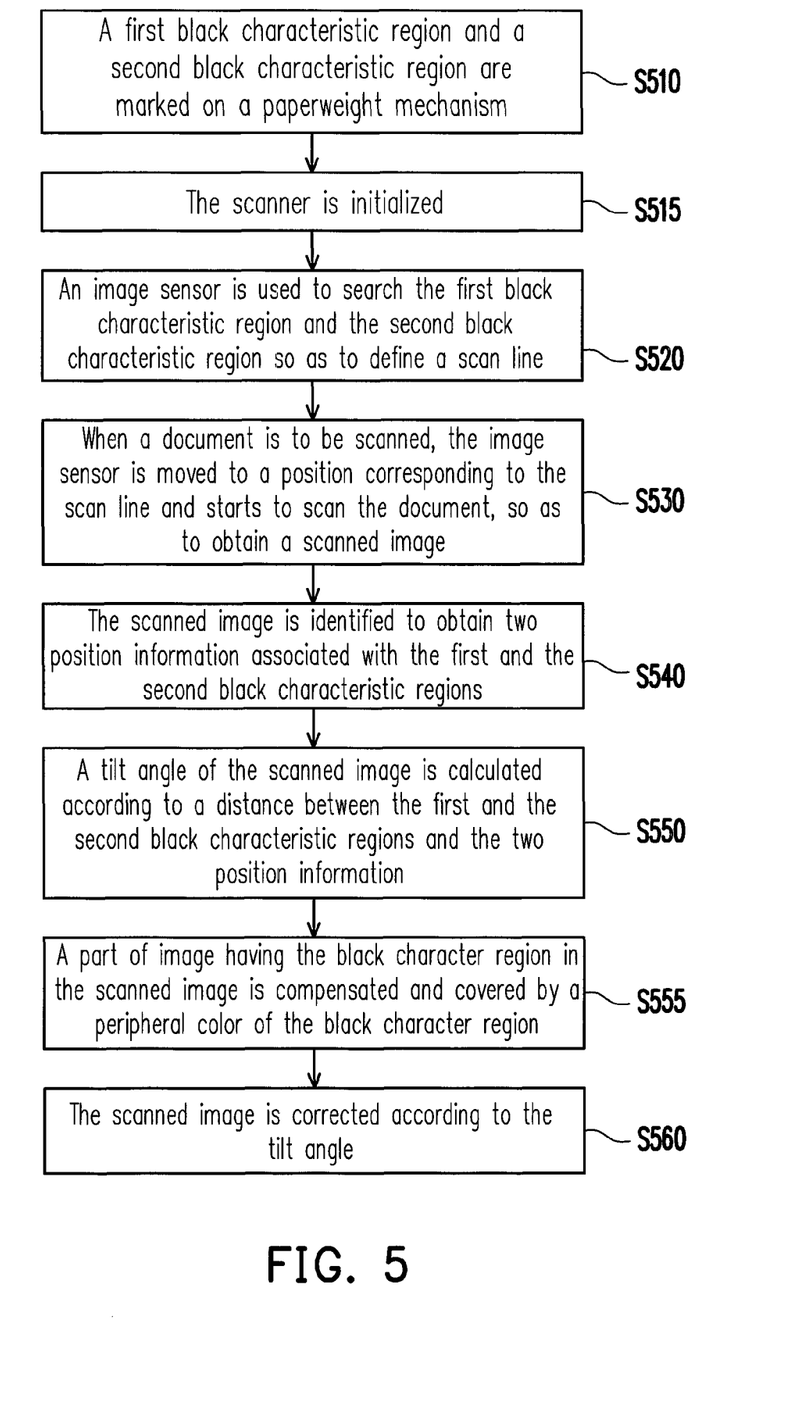
FIG. 5 is a flowchart illustrating a method for image correction of a scanner according to an embodiment of the invention.

According to the above descriptions, a method for image correction is deduced as follows. FIG. 5 is a flowchart illustrating a method for image correction of a scanner according to an embodiment of the invention. Referring to FIG. 5, the method for image correction of the scanner can be described as follows.

A first black characteristic region and a second black characteristic region are marked on a paperweight mechanism (step S510).

An image sensor is used to search the first black characteristic region and the second black characteristic region so as to define a scan line (step S520).

When a document is to be scanned, the image sensor is moved to a position corresponding to the scan line and starts to scan the document, so as to obtain a scanned image (step S530).

The scanned image is identified to obtain two position information associated with the first and the second black characteristic regions (step S540).

A tilt angle of the scanned image is calculated according to a distance between the first and the second black characteristic regions and the two position information (step S550).

The scanned image is corrected according to the tilt angle (step S560).

An embodiment is provided below to further convey the spirit of the invention to those skilled in the art.

Referring to FIG. 1C and FIG. 5, in detail, in the step S510, the first black characteristic region F1 and the second black characteristic region F2 can be two symmetric black characteristic regions of the same size. The two black characteristic regions can be rectangles of the same size. The size of each of the two black characteristic regions can be 1 mm×1 mm. The sizes and shapes of the two black characteristic regions of the present embodiment are only used as a selective example, and the invention is not limited thereto.

After the step S510 of marking the first black characteristic region F1 and the second black characteristic region F2, a step S515 can be executed, by which a certain part or all parts of the scanner can be initialized, for example, the ADF, the detection device or the image sensor can be initialized. Then, the step S520 is executed to define the scan line SL.

When the step S520 is executed, the image sensor can be used to search the first black characteristic region F1 and the second black characteristic region F2, so as to define the scan line SL. The scan line SL can be aligned to an edge of the first black characteristic region F1 and an edge of the second black characteristic region F2, where an extending direction of the scan line SL can be parallel to the second direction Dx. When the scan line SL is defined, the position information of the scan line SL can be further stored in the storage device, so as to facilitate directly driving the image sensor to the position of the scan line SL during a next document scanning operation.

When the step S530 is executed, the image sensor is moved to the position corresponding to the scan line and starts to scan the document, and after the document completely passes through the paperweight mechanism 120, the image sensor can be controlled to continually perform detection for another period of time, so as to avoid incomplete scanning.

Then, in the step S540, the scanned image is identified. Referring to FIG. 3, the scanned image 300 of FIG. 3 has the tilt angle θ, and two black lines are appeared at the end part of the scanned image 300. It can be identified whether each scan information in the scanned image 300 of the document has the black characteristic region, so as to obtain the two position information (P1, P2) associated with the first black characteristic region F1 and the second black characteristic region F2. The two position information (P1, P2) can be two edge point information at the end part of the scanned image 300.

Then, the step S550 is executed, by which a mathematic trigonometric function is used to calculate the tilt angle θ of the scanned image 300 according to the first distance D1 between the first black characteristic region F1 and the second black characteristic region F2 and the two position information (P1, P2).

Regarding the step S550, in another embodiment, during a process of calculating the tilt angle θ of the scanned image 300, the distance between the first and the second black characteristic regions F1 and F2 along the second direction Dx is defined as the first distance D1, where the first distance D1=|position A−position B|, and a relative distance between the two position information (P1, P2) along the first direction Dy is defined as a second distance D2, where the second distance D2=|position D−position C|. Then, the tilt angle θ=tan$^{-1}$(D2/D1) is obtained.

Regarding the step S550, in another embodiment, the tilt angle θ can also be obtained according to a look-up table, where the look-up table includes a corresponding relationship of the first distance D1, the second distances D2 associated with the two position information, and the tilt angle θ.

It should be noticed that between the step S550 and the step S560, a step S555 can be executed, by which a part of image having the black character region in the scanned image is compensated and covered by a peripheral color of the black character region, so as to achieve a better scanning quality.

Then, the step S560 is executed, by which the scanned image is directly corrected according to the tilt angle θ. In this way, the scanner can correct the tilt angle θ of the scanned image, so as to improve the scanning quality.

It should be noticed that after the step S560, the corrected scanned image can be stored or output to external.

Although possible patterns of the method for image correction have been described in the above embodiments, it should be understood by those skilled in the art that the design of the method for image correction of the scanner varies with manufacturers, thus, application of the present invention should not be limited to the possible patterns. In other words, the spirit of the present invention is met as long as the first black characteristic region and the second black characteristic region are marked on the paperweight mechanism, the scanned image is identified to obtain the two position information associated with the first and the second black characteristic regions, and the tilt angle is calculated according to information of the two black characteristic regions and the two position information.

In summary, in the method for image correction of the scanner of the invention, the first black characteristic region and the second black characteristic region are marked on the paperweight mechanism, and the image sensor is used to search the first black characteristic region and the second black characteristic region to define the scan line. When the document is to be scanned, the image sensor is moved to a position corresponding to the scan line and starts to scan the document, so as to obtain a scanned image. The scanned image is identified to obtain the two position information associated with the first and the second black characteristic regions. The tilt angle of the scanned image is calculated according to a distance between the first and the second black characteristic regions and the two position information. Then, the scanned image is corrected according to the tilt angle. In this way, the problem mentioned in the related art can be effectively resolved.

Moreover, the embodiments of the invention has following advantages:
1. The two black characteristic regions are marked on the paperweight mechanism of the ADF, and the tilt angle of the document is accordingly calculated, which is faster and more accurate compared to the conventional image processing.
2. The controller can perform a simple mathematic operation and correction to the scanned image received by the image sensor.
3. A burden of post image processing can be reduced and the processing efficiency can be greatly improved, so as to achieve the expected scanning quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for image correction of a scanner, wherein the scanner comprises an image sensor and an automatic document feeder, the automatic document feeder has a paperweight mechanism, and the paperweight mechanism is used to press a document flat, the method for image correction of the scanner comprising:
marking a first black characteristic region and a second black characteristic region on the paperweight mechanism;
using the image sensor to search the first black characteristic region and the second black characteristic region, so as to define a scan line;
when the document is to be scanned, moving the image sensor to a position corresponding to the scan line and starting to scan the document, so as to obtain a scanned image;
identifying the scanned image to obtain two position information associated with the first and the second black characteristic regions;
calculating a tilt angle of the scanned image according to a distance between the first and the second black characteristic regions and the two position information; and
correcting the scanned image according to the tilt angle.

2. The method for image correction of the scanner as claimed in claim 1, further comprising initializing the scanner before defining the scan line.

3. The method for image correction of the scanner as claimed in claim 1, wherein the scan line is aligned to an edge of the first black characteristic region and an edge of the second black characteristic region.

4. The method for image correction of the scanner as claimed in claim 1, wherein a mathematic trigonometric function is used to calculate the tilt angle.

5. The method for image correction of the scanner as claimed in claim 1, wherein the step of calculating the tilt angle comprises:

calculating a first distance D1 between the first and the second black characteristic regions, a second distance D2 between the two position information, and the tilt angle $\tan^{-1}(D2/D1)$, wherein the first distance is parallel to the scan line, and the second distance is perpendicular to the scan line.

6. The method for image correction of the scanner as claimed in claim 1, wherein the step of calculating the tilt angle comprises:

obtaining the tilt angle according to a look-up table, wherein the look-up table comprises a corresponding relationship of the distance between the first and the second black characteristic regions, the two position information, and the tilt angle.

7. The method for image correction of the scanner as claimed in claim 1, wherein before correcting the scanned image, a part of image having the black character region in the scanned image is first compensated and covered by a peripheral color of the black character region.

8. The method for image correction of the scanner as claimed in claim 1, wherein when the scan line is defined, position information corresponding to the scan line is further stored.

9. The method for image correction of the scanner as claimed in claim 1, wherein the first black characteristic region and the second black characteristic region are symmetric and identical in size.

10. The method for image correction of the scanner as claimed in claim 1, wherein the first black characteristic region and the second black characteristic region are rectangles of a same size.

11. A scanner, comprising:

an automatic document feeder, having a paperweight mechanism, wherein the paperweight mechanism is used to press a document flat, and the paperweight mechanism has a first black characteristic region and a second black characteristic region thereon;

a detection device, for detecting whether the document is placed on the automatic document feeder;

an image sensor, for capturing an image of the document; and a controller, coupled to the automatic document feeder, the detection device and the image sensor, for controlling operations of the automatic document feeder, the detection device and the image sensor, identifying a scanned image of the document to obtain two position information associated with the first and the second black characteristic regions, and calculating a tilt angle of the scanned image according to a distance between the first and the second black characteristic regions and the two position information, so as to correct the scanned image according to the tilt angle.

12. The scanner as claimed in claim 11, wherein the controller controls the image sensor to search the first black characteristic region and the second black characteristic region, so as to define a scan line.

13. The scanner as claimed in claim 12, wherein the scan line is aligned to an edge of the first black characteristic region and an edge of the second black characteristic region.

14. The scanner as claimed in claim 12, wherein when the document is to be scanned, the controller controls the image sensor to move to a position corresponding to the scan line, so as to scan the document.

15. The scanner as claimed in claim 12, wherein the controller comprises a storage device for storing the scanned image and position information corresponding to the scan line.

16. The scanner as claimed in claim 11, wherein the controller uses a mathematic trigonometric function to calculate the tilt angle of the scanned image.

17. The scanner as claimed in claim 11, wherein the controller calculates a first distance D1 between the first and the second black characteristic regions, a second distance D2 between the two position information, and the tilt angle $\tan^{-1}(D2/D1)$, wherein the first distance is parallel to the scan line, and the second distance is perpendicular to the scan line.

18. The scanner as claimed in claim 11, wherein the controller obtains the tilt angle according to a look-up table, wherein the look-up table comprises a corresponding relationship of the distance between the first and the second black characteristic regions, the two position information, and the tilt angle.

19. The scanner as claimed in claim 11, wherein before the controller corrects the scanned image, a peripheral color of the black character region is used to compensate and cover a part of image having the black character region in the scanned image.

20. The scanner as claimed in claim 11, wherein the first black characteristic region and the second black characteristic region are symmetric and identical in size.

21. The scanner as claimed in claim 11, wherein the first black characteristic region and the second black characteristic region are rectangles of a same size.

22. The scanner as claimed in claim 11, further comprising an interface module for connecting an external host, wherein the controller controls an operation of the interface module.

\* \* \* \* \*